(12) United States Patent
Swenson et al.

(10) Patent No.: US 7,801,819 B2
(45) Date of Patent: Sep. 21, 2010

(54) RENDERING RIGHTS DELEGATION SYSTEM AND METHOD

(75) Inventors: Eric John Swenson, Soquel, CA (US); Ryuji Ishiguro, Tokyo (JP); Motohiko Nagano, Tokyo (JP); Pierre Chavanne, Davis, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1683 days.

(21) Appl. No.: 10/957,109

(22) Filed: Oct. 1, 2004

(65) Prior Publication Data

US 2005/0138357 A1 Jun. 23, 2005

Related U.S. Application Data

(60) Provisional application No. 60/508,771, filed on Oct. 3, 2003.

(51) Int. Cl.
G06F 21/00 (2006.01)

(52) U.S. Cl. .......................... 705/52; 380/201; 705/51; 705/54; 705/57; 705/59; 707/9; 707/104.1; 713/155; 713/156; 713/182; 713/183; 713/184; 726/26; 726/27; 726/28; 726/29; 726/31; 726/32

(58) Field of Classification Search ................. 713/155; 726/26
See application file for complete search history.

(56) References Cited

U.S. PATENT DOCUMENTS

| | | | |
|---|---|---|---|
| 6,418,421 B1 | 7/2002 | Hurtado et al. | |
| 7,043,453 B2 * | 5/2006 | Stefik et al. | 705/52 |
| 7,100,044 B2 * | 8/2006 | Watanabe et al. | 713/156 |
| 7,421,412 B2 * | 9/2008 | Ramanathan | 705/59 |
| 2002/0013772 A1 | 1/2002 | Peinado | |
| 2003/0028488 A1 | 2/2003 | Mohammed et al. | |
| 2003/0084306 A1 | 5/2003 | Abburi et al. | |
| 2003/0097655 A1 * | 5/2003 | Novak | 725/31 |
| 2003/0196085 A1 * | 10/2003 | Lampson et al. | 713/156 |
| 2003/0233553 A1 * | 12/2003 | Parks et al. | 713/178 |
| 2004/0003139 A1 | 1/2004 | Cottrille et al. | |

(Continued)

OTHER PUBLICATIONS

International Preliminary Report on Patentability PCT/US2004/032277 mail date Mar. 13, 2007.

(Continued)

*Primary Examiner*—William R Korzuch
*Assistant Examiner*—Bryan Wright
(74) *Attorney, Agent, or Firm*—Fitch, Even, Tabin & Flannery

(57) ABSTRACT

Methods and systems for controlling the distribution of digital content are provided. A license holder acquires protected content and an original digital license to the protected content from a content provider system. The license holder in turn delegates all or part of the grants in that original license to other qualified devices or clients. The content remains in its original, protected or encrypted form while it is delivered from the license holder to the client along with a digital sublicense that the client receives from the original license holder, whereupon the content can then be rendered. The original digital license defines or governs the conditions under which such delegation occurs, and includes terms under which such delegation is permitted to continue in order to enforce the intent of the content provider.

17 Claims, 7 Drawing Sheets

U.S. PATENT DOCUMENTS

| | | |
|---|---|---|
| 2004/0003269 A1 | 1/2004 | Waxman et al. |
| 2004/0003270 A1 | 1/2004 | Bourne et al. |
| 2004/0005914 A1* | 1/2004 | Dear .......................... 455/563 |
| 2004/0127196 A1 | 7/2004 | Dabbish et al. |
| 2005/0004873 A1* | 1/2005 | Pou et al. ..................... 705/51 |
| 2005/0033967 A1* | 2/2005 | Morino et al. ............. 713/182 |
| 2005/0071280 A1* | 3/2005 | Irwin et al. ................... 705/59 |
| 2005/0160272 A1* | 7/2005 | Teppler ..................... 713/178 |

OTHER PUBLICATIONS

PCT International Search Report and Written Opinion, mailed date Feb. 20, 2007.

* cited by examiner

RENDERING RIGHTS DELEGATION SYSTEM AND METHOD

CROSS REFERENCE TO RELATED APPLICATIONS

This application claims the benefit of U.S. Provisional Application No. 60/508,771, filed Oct. 3, 2003.

FIELD OF THE INVENTION

The present invention relates to the field of content delivery. More particularly, the present invention relates to the field of real-time delivery of licenses for previously stored encrypted content.

BACKGROUND

Providers of digital video content or audio content are reluctant to deliver this content over the Internet without effective content protection. While the technology exists for content providers to provide content over the Internet, digital content by its very nature is easy to duplicate either with or without the owner's authorization. The Internet allows the delivery of the content from the owner, but that same technology also permits widespread distribution of unauthorized, duplicated content.

Digital Rights Management (DRM) is a digital content protection model that has grown in use in recent years as a means for protecting file distribution. DRM usually encompasses a complex set of technologies and business models to protect digital media or other data and to provide revenue to content owners.

Many known DRM systems use a storage device, such as a hard disk drive component of a computer, that contains a collection of unencrypted content (or other data) provided by content owners. The content in the storage device resides within a trusted area behind a firewall. Within the trusted area, the content residing on the storage device can be encrypted. A content server receives encrypted content from the storage device and packages the encrypted content for distribution. A license server holds a description of rights and usage rules associated with the encrypted content, as well as associated encryption keys. (The content server and license server are sometimes part of a content provider system that is owned or controlled by a content provider (such as a studio) or by a service provider.) A playback device receives the encrypted content from the content server for display and receives a license specifying access rights from the license server.

Some DRM processes consist of requesting an item of content, encrypting the item with a content key, storing the content key in a content digital license, distributing the encrypted content to a playback device, delivering a digital license file that includes the encrypted content key to the playback device, and decrypting the content file and playing it under the usage rules specified in the digital license. However, a security issue can arise in this process. The content provider sometimes can lose control over the content's security and distribution once the encrypted content and associated digital license file are transmitted to and stored on the playback device. Although the playback device may include a trusted area where the encrypted content is decrypted and decoded, the trusted area on a playback device can be less secure than a trusted area maintained directly by the content provider system.

Moreover, many DRM systems operate on the principle that a client or playback device is required to acquire its own digital license to the protected content from a license server controlled by the content provider, and that the client remains the sole owner of that digital license.

However, such known DRM schemes can lack flexibility in that the owner of the playback device may be limited to the rendering or use of the content on only that one device and be prohibited from using the content on other of his/her devices. Moreover, content owners may desire to make content available to a larger organization, such as a hotel or college dormitory, which in turn can be permitted to distribute the content to customers or residents under conditions that can be controlled by the content owner.

Thus an improved method and system of protection mechanisms is desirable to accomplish delivery of protected data or media.

SUMMARY OF THE ILLUSTRATED EMBODIMENTS

Disclosed is a new and secure method and system by which a license holder can acquire an original digital license to protected content from a content provider system, and then in turn can delegate all or part of the grants in that original license to other qualified devices or clients. It is not required that the content be transformed in any manner as it is transferred to the clients. The content remains in its original, protected form until it is received at the client along with a digital sublicense that the client receives from the original license holder whereupon the content is then rendered or otherwise used.

Thus a method and system of distributing content provided by a content provider system is provided. The content and a first digital license are stored on a first device. The first digital license has a first expiration time period and is adapted to govern the use of the content by the first device.

In accordance with another embodiment, the present invention can be characterized as a method wherein a first digital request corresponding to a first request for use of the content is transmitted from a secondary device to the first device. A second digital license is transmitted from the first device to the secondary device after receipt by the first device of the first digital request. The second digital license governs the use of the content by the secondary device and has a second expiration time period that is less than the first expiration time period. A first portion of the encrypted content is provided from the first device to the secondary device. The first portion of the content is decrypted at the secondary device during at least a portion of the second expiration time period.

A second digital request corresponding to a second request for use of the content is transmitted from the secondary device to the first device. A third digital license is transmitted from the first device to the secondary device. The third digital license is adapted to govern the use of the content by the secondary device and has a third expiration time period that is less than the first expiration time period. A second portion of the encrypted content is provided from the first device to the secondary device. The second portion of the content is decrypted at the secondary device during at least a portion of the third expiration time period.

In one aspect of certain embodiments, a plurality of additional digital requests are transmitted from a plurality of additional secondary devices to the first device. Each of the plurality of additional digital requests corresponds to an additional request for use of the content. A plurality of additional digital licenses are transmitted from the first device to the plurality of additional secondary devices after receipt by the first device of the plurality of additional digital requests. The plurality of additional digital licenses govern the use of the content by the plurality of additional secondary devices and have a plurality of additional expiration time periods each of which is less than the first expiration time period.

A plurality of additional portions of the encrypted content are provided from the first device to the plurality of additional secondary devices. The plurality of additional portions of the content are decrypted in such a manner that each one of the plurality of additional secondary devices decrypts one of the plurality of additional portions of the content during one of the plurality of additional expiration time periods. The plurality of additional portions of the content are simultaneously rendered by the plurality of additional secondary devices.

In another aspect of the disclosed embodiments, an active license count is calculated at the first device. This count corresponding to a first sum of the second digital license and the plurality of additional digital licenses that have been transmitted from the first device reduced by a second sum of the second digital license and the plurality of additional digital licenses that correspond to expiration time periods that have expired. A supplemental digital request corresponding to a supplemental request for use of the content is transmitted from a supplemental secondary device to the first device.

A supplemental digital license is transmitted from the first device to the supplemental secondary device when the active license count does not exceed a maximum permitted license count as set forth in the first digital license. The supplemental digital license governs the use of the content by the supplemental secondary device and has a supplemental expiration time period that is less than the first expiration time period.

There are various aspects to the present inventions. It should therefore be understood that the preceding is merely a brief summary of some embodiments and aspects of the present inventions. Embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

DETAILED DESCRIPTION

Figure 1A:
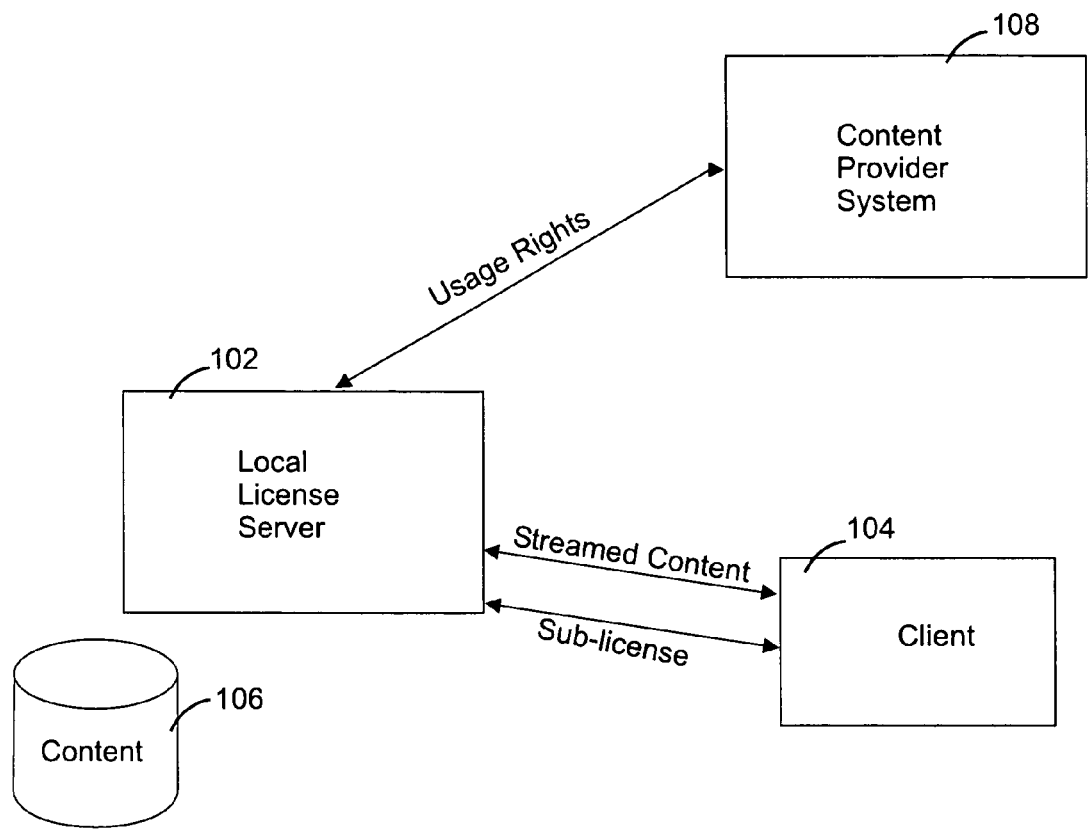
FIGS. 1a and 1b are simplified block diagrams of a system according to some embodiments for use in distributing content provided by a content provider system.

In the following description, reference is made to the accompanying drawings which form a part hereof and which illustrate several embodiments of the present invention. It is understood that other embodiments may be utilized and structural and operational changes may be made without departing from the scope of the present invention.

Disclosed is a new and secure method and system by which, according to one embodiment, a license holder acquires an original digital license to protected content from a content provider system, and then in turn delegates all or part of the grants in that original license to other qualified devices or clients. It is not required that the content be transformed in any manner as it is transferred to the clients. According to some embodiments of the invention, the content remains in its original, protected form until it is received at the client device along with a digital sublicense that the client device receives from the original license holder whereupon the content is then rendered.

The original digital license defines or governs the conditions under which such delegation occurs, and includes terms under which such delegation is permitted to continue in order to enforce the intent of service or content providers. Because it often is desirable to prevent network-wide access to the content, certain rules are used to limit this exposure. For example, one embodiment of the invention enables a local device or license server to specify:

The number of such delegated licenses (i.e. sublicenses) that may exist at any one point in time which will limit network wide access to the content;

The interval of time after which such a sublicense expires at the receiving client; and The overall license and sublicense duration limits (i.e. expiration time periods) for both devices.

Such restrictions cause un-renewed sublicenses to expire as to one client device and to be made available to another requesting client device.

Thus the end user operator of a local license server that received content from a service provider or content provider is allowed to stream protected content from the local server within a home network or other localized network. The end-user operator of the local license server acquires content and usage rights through the Internet, physical media, or super distribution, and if the usage rights allow, client devices are able to render that content as it is streamed from the local server to the clients.

According to one embodiment of the invention, the client devices and the local server allow the end-user of the client device to browse the localized network for local servers, and browse the local servers for streamable content. Once located, a client device sends a request to the local server for the streaming of that content to the client device, where it can be rendered.

The content or service provider issuing the original license or usage rights to the end-user of the local server controls whether or not this streaming is allowed, and whether a limit is placed on the number of client devices that may simultaneously render the streamed content governed by the usage right.

The local server can limit the number of simultaneous connections to it for streaming a particular piece of content to a maximum value as specified by the service provider in the original usage right governing access to the content. The maximum limit can be specified on a per-usage right basis. Thus any content governed by a usage-right will be bound by the limit specified in that usage right.

For example, if the value of this limit is 3, and the usage right governs exactly one item of content, then the local server may only allow 3 client instances to access that item of content at a time. However, if the usage right governs more than one item of content provided by a particular content provider, then the limit may apply across all items of content governed by the usage right. The local server may enforce this usage right-specific limit and not allow more than a specified maximum number of client devices to simultaneously have active usage rights for all items of content (such as for example, a plurality of movies or songs) governed by this usage right.

In some embodiments, the local server authenticates the client device as a valid, registered, and unrevoked client device. The local server refuses to grant access to the content if the client device has been revoked, is not properly registered, or has been tampered with such that its identity and authorization cannot be determined. Both the local server and the client device are required to supply valid digital certificates and be registered with the service provider that issued the usage rights governing the requested content.

One embodiment of the invention involves the use of a content provider system that is owned or operated by a content provider, such as for example a studio or service provider. This system includes a license server that communicates with a local server device that may be located on a premises, such as for example, a residence, a college dormitory, a resort, a hotel, a ship or an aircraft, etc. The license server provides the local server with content or access to content along with an original digital license corresponding to each item of content.

The local server in turn communicates with one or more client devices that may be placed in other locations in the same premises that houses the local server. The client devices include personal computers, portable audio players, portable video players, "set top boxes" that control televisions or home entertainment systems, etc. The local server provides the protected content received from the content provider system to the client devices, either via data streaming or via a unitary download according to the rights set forth in the original digital license.

Certain embodiments of the present invention employ the concept of sublicenses (sometimes called "leases") for governing the use, viewing or rendering of the protected content by the plurality of client devices so that the master usage rights corresponding to the original license are not violated. To further enhance security, the sublicenses have a "life" or expiration time period so that periodically (such as for example, at five, ten or sixty minute intervals) the sublicenses expire, thus requiring the client device to seek the issuance of another sublicense from the local server in order to continue the use or rendering of the content. In some embodiments of the invention, relatively short expiration time periods, such as for example, five or ten minutes, may be desirable when client devices remain in communication with the local server as content is streamed to the client devices for "real time" rendering. In other embodiments, relatively longer expiration time periods, such as for example one week, may be desirable in systems where client devices receive the protected content via a unitary download and are disconnected from a network so that communication with the local server is not possible. Those client devices could then render or otherwise use the content at any time during the longer expiration time period while the client devices are disconnected.

When requested by each client device, the local server generates a sublicense that is tailored for that client device only and does so without intervention by the content provider system. Thus the local server can provide and control the use of the content by a plurality of client devices without the need for repeated communications between the client devices and the content provider system.

As described in more detail below, some embodiments of the invention include the ability of the local server to control the number of simultaneous content streams that it provides to the client devices. This control includes the support of new client devices coming on-line to access and render the same content while previous client devices drop off line and discontinue content rendering.

Figure 1B:
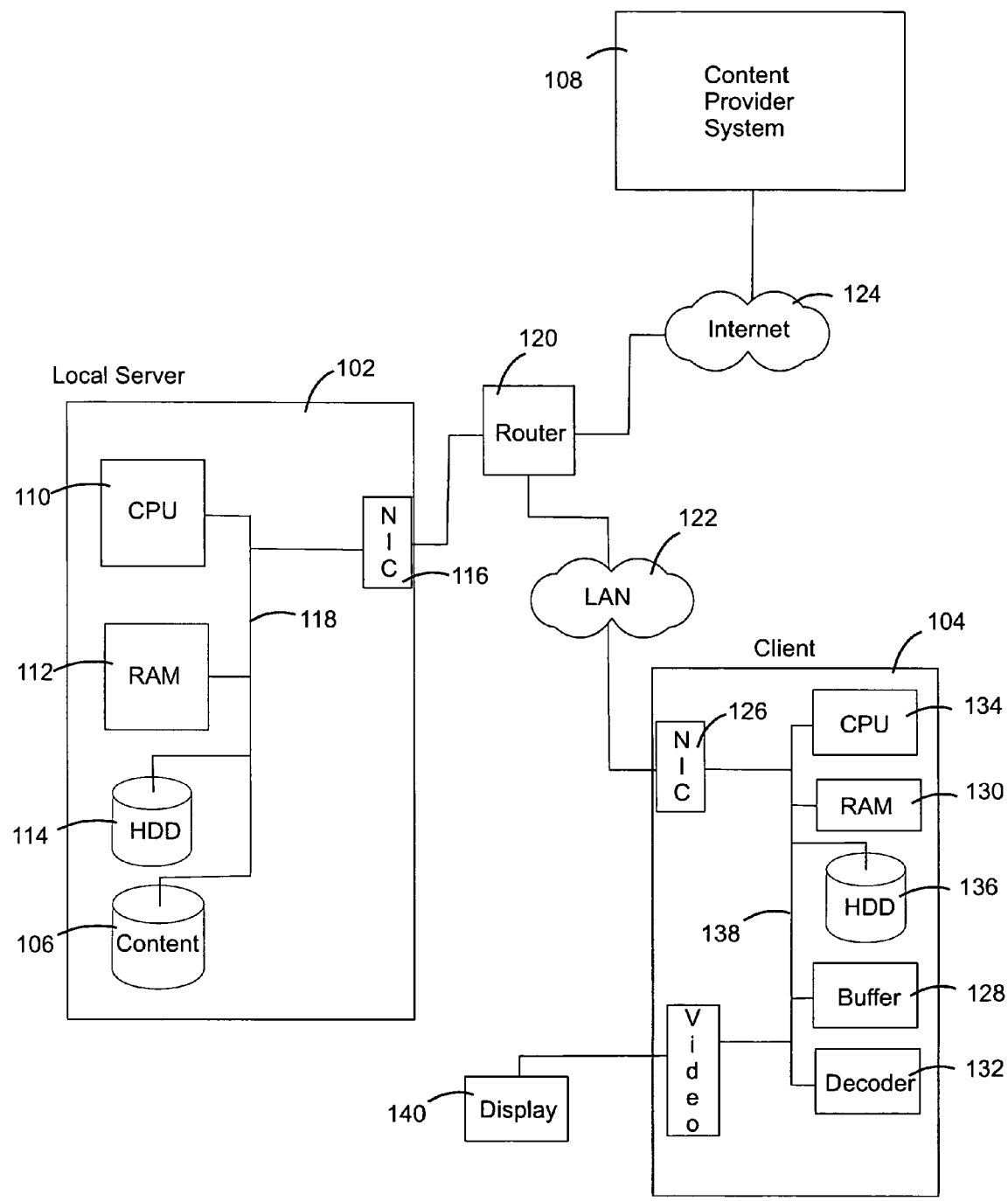

FIGS. 1a and 1b show a hardware environment according to one embodiment of the invention. A local license server 102 is a personal computer that includes a central processor unit (CPU) 110, a main memory (random access memory (RAM)) 112, a hard disk drive 114, a mass storage device 106 and an Ethernet network interface circuit (NIC) 116, all coupled together by a conventional bidirectional system bus 118. Alternatively, the local server 102 can be a set-top box running DRM software or any other type of computer device. The network interface circuit 116 includes a physical interface circuit for sending and receiving communications on an Ethernet local area network (LAN) 122 and on the Internet 124 via a router 120.

According to some embodiments, the network interface circuit 116 is implemented on an Ethernet interface card within the local server 102. However, it should be apparent to those skilled in the art that the network interface circuit 116 can be implemented within the local server 102 in any other appropriate manner, including placing the network interface circuit 116 onto the motherboard itself. The mass storage device 106 stores encrypted content received from a content provider system 108 controlled by a content provider or a service provider and may include both fixed and removable media using any one or more of magnetic, optical or magneto-optical storage technology or any other available mass storage technology. The hard disk drive 114 stores operating system software and license data. The system bus 118 contains an address bus for addressing any portion of the main memory 112. The system bus 118 also includes a data bus for transferring data between and among the CPU 110, the main memory 112, the hard disk drive 114, the mass storage device 106 and the network interface circuit 116.

A playback or client device 104 can be a personal computer, a set-top box coupled to a television for display, a portable device that can be disconnected from a localized network, or any other type of a computer. The client device 104 controls the transmission of the protected content from a local storage device, such as a hard disk drive 136, by decrypting and rendering the content prior to transmission to a television or other display 140. The client device 104 includes a client network interface circuit (NIC) 126, a buffer 128, a system memory 130, a decoder 132, and a CPU 134 all coupled via a bi-directional bus 138. The client network interface circuit 126 preferably couples the client device 104 to the local server 102 via the router 120 to receive encrypted content stored in the local server 102 and to receive associated encryption keys from the local server 102.

The system memory 130 and/or the hard disk drive 136 stores operating software used to enable operation of the client device 104. The buffer 128 receives and buffers sequential portions of streaming encrypted content from the local server 102 while using the associated encryption key needed to decrypt a portion of the encrypted content. The portion of the encrypted content and the associated encryption key are sent to the decoder 132. The decoder 132 decrypts and decodes the content using one or more of the encryption keys received from the local server 102 and associated with the content.

As explained in further detail below, in some embodiments multiple encryption keys are used to encrypt/decrypt the content such that each encryption key encrypts/decrypts a portion of the content. The encryption keys are transmitted from the local server 102 to the client device 104 as they are needed rather than all at once. The encryption keys are not stored in system memory of the client device 104, but rather, only temporarily buffered in the buffer 128. In this manner, security of the encryption keys is improved. Alternatively, a single encryption key can be used to encrypt/decrypt the entire content.

The content provider system 108 issues usage rights via one or more original digital licenses that allow delegation of rendering rights to another DRM application, subject to various limitations. The content provider system 108 issues the original usage rights to the local server 102. The original usage rights specify whether the local server 102 can delegate content rendering rights to the client device 104. They can also specify the maximum number of client instances that can simultaneously render one item of content or simultaneously render several items of content governed by the usage right. Finally, since the maximum limit is implemented through digital sublicenses with sublicense usage rights, the content provider system 108 specifies the sublicense expiration time period.

The local server 102 registers with one or more service providers as a prerequisite to the receipt of content. The local server 102 runs within a home or other premises on the localized network 122 and is under the control of an end user.

The end user acquires usage rights to protected content, such as for example video or audio content, using the software issued by the content provider system 108 for this purpose (e.g. a web browser) and stores the usage rights on the local server's hard drive 114. Likewise, the end user acquires protected content from service providers (directly, or through physical media or super distribution) and stores that content on the local server's mass storage device 106 (or otherwise accessible to the local server 102 on the local network 122). The local server 102 allows the client device 104 to be able to locate the local server 102 and to browse available content on it. The local server 102 also supports the streaming of protected content to the client device 104. Finally, the local server 102 supports a client device request for usage rights for protected content and the location of the original usage rights that govern access to the content.

Once this request is received from the client device 104 and the original usage rights located, the local server 102 checks the original usage rights and generates sublicense usage rights for the client device 104 that are consistent with the original usage rights. Then, the local server 102 sends the usage rights to the client device 104, which then renders or otherwise uses the content in essentially the same way that it would render or use any streamed content where usage rights are available.

According to some embodiments, the local server functions include:

The use of a license acquisition protocol (LAP) to authenticate a client (which includes checking the client device's digital certificate) and send security metadata (including the local server's trusted time) to the client device 104;

The use of the LAP to ensure the client device 104 has processed the security metadata prior to issuing usage rights to it;

The determination of whether sublicense usage rights can be created for the client device 104, based upon an original usage right, and other information from the client device 104;

The enforcement of the maximum number of simultaneous accesses to the content governed by the original usage right;

The production of a digital sublicense tailored for use by only one client device and using a sublicense expiration time period as specified in the original usage right; and The renewal of sublicense usage rights upon request from the client device 104, since sublicenses "time out" after an interval that is specified by the content or service provider.

The client device 104 locates local servers on the local network 122 and browses available content. Once the end-user has chosen an item of content to render, the client device 104 determines whether usage rights already exist locally for the protected video content. If they don't, it engages in a LAP protocol to acquire those usage rights from the content provider system.

According some embodiments of the invention, the DRM software on both the client device 104 and local server 102 is used to manage security and create the sublicense usage right. Once the client device 104 has one or more usage rights for the protected content, it renders or otherwise uses the content. When the sublicense usage right is about to expire, the client device 104 requests a renewed sublicense. The client device 104 again uses the LAP to renew the sublicense usage right. Upon receipt of a new sublicense usage right, the client device 104 continues rendering or using the content.

The client device 104, using LAP, sends messages to the local server 102, which, in turn, uses LAP to create sublicense usage rights. The local server 102 sends these sublicense usage rights to the client device 104 using LAP thus enabling the client device 104 to render the streamed content.

Since sublicense usage rights provide time-limited access to the protected content, the client device 104 must periodically acquire new sublicense usage rights from the local server 102. The client device 104 anticipates when new sublicense usage rights must be acquired, and a process similar to the initial acquisition of sublicense usage rights is used to renew these rights. The client device 104 has a background thread for acquiring updated sublicense usage rights.

Because the sublicenses are time-limited, the use of clocks or counters are made in some embodiments. In general, clocks on systems are not trustworthy. To ensure that the client device 104 accurately measures the sublicense validity or expiration time period, the use of a secure clock is made to provide trusted time. The client device 104 is provided access to a secure clock residing on the local server 102 to obtain accurate time measurements. Alternatively, a secure distributed clock algorithm can used. Secure distributed clock algorithms ensure that the notion of time on the client device 104 is secure, and monotonically increasing, and on a regular basis are updated for accuracy.

In order to enable the local server 102 to provide content to the client device 104, the service or content provider may distribute DRM software for use by the local server 102. To receive this, the consumer or owner of the local server 102 may establish an account with the service provider, supply a credit card account number for payment for the content and to identify the local server, etc. The service or content provider then may permit the downloading of the DRM software which can install itself and configure the local server 102 as an authorized distributor of content.

This configuring of the local server 102 includes a personalization step whereby local server is given set of cryptographic keys that uniquely identifies the local server 102. Upon completion of this process the local server 102 has a set of secret data that is tamper resistant and not easily accessible by the user and that is uniquely bound to that one machine so that the local server 102 can be uniquely identified to the content provider system 108. After this personalization step, the local server 102 is ready for the receipt of content.

Figure 2:
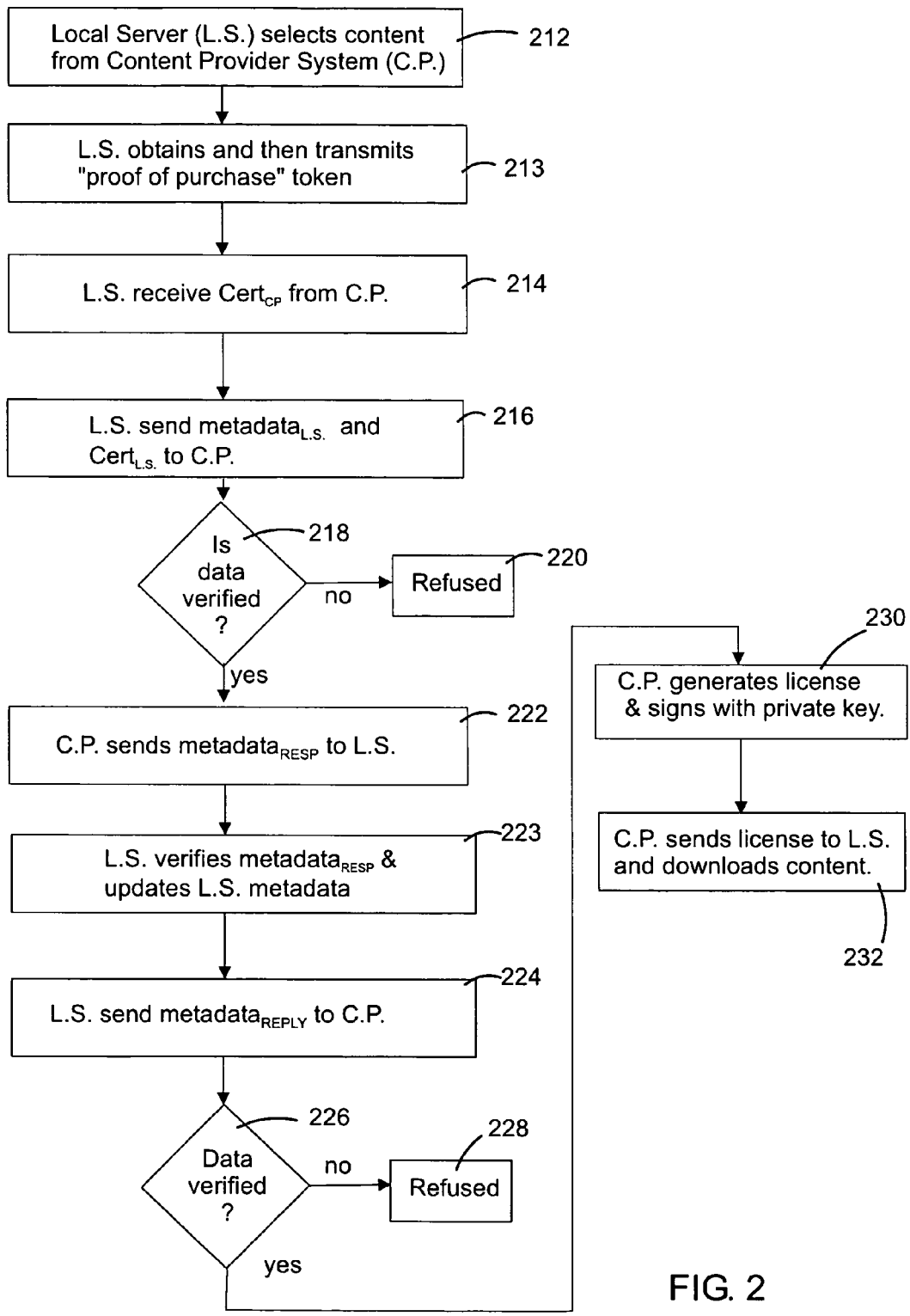
FIG. 2 is a simplified flow diagram for a process for use in configuring a local server to receive protected content and issue digital sublicenses.

FIG. 2 depicts a simplified flow diagram of a process for use in configuring the local server 102 to receive the protected content and issue digital sublicenses. In step 212, the user of the local server selects the desired content from the content provider system. This selection process can be accomplished through a browser mechanism. In other words, a digital license is requested for the content of interest. In step 213, The user of the local server pays for the license or otherwise proves to the content provider system that the user is entitled to the license. The content provider system then sends a "proof of purchase" token to the local server that can be redeemed later by the local server for a license. The local server then returns this "proof of purchase" token to the content provider system at a later point in time as a condition for obtaining a license. In response, the content provider system provides the local server with a digital certificate ($Cert_{CP}$) corresponding to the content provider system. 214 The digital certificate is part of an electronic message and is used for security purposes. It is used to verify the identity of the content provider system and to provide the local server with a means to encode a reply. In this case, the certificate includes a public key for use by the local server to encode its reply and further includes identification information associated with the content provider.

In step 216, the local server uses the digital certificate to verify the authenticity of the content provider system and then transmits local server metadata and a local server digital certificate ($Cert_{LS}$) to the content provider system. The local server metadata is signed with the private key associated with the $Cert_{LS}$. The metadata includes a local server nonce ($Nonce_{LS}$), i.e., a random number generated by the local server and used to ensure that responses processed are actually responses to the request, and not replayed responses from earlier sessions.

The content provider system determines whether the data that it has just received is satisfactory. 218 In other words, this is a determination whether the local server is still in good standing with the content provider system by checking the $Cert_{LS}$ to make sure that it is valid and not revoked. If the data is not satisfactory, then the content provider system refuses to make the content available. 220 Alternatively, if the data is verified by the content provider system, it generates a content provider system nonce ($Nonce_{CP}$) and up-to-date security response metadata (which includes content provider trusted time) and transmits all of this (as well as the previously-received $Nonce_{LS}$) to the local server. 222 The response metadata is signed with the content provider system's private key associated with its certificate ($Cert_{CP}$).

In step 223, the local server uses the public key associated with the content provider system's certificate ($Cert_{CP}$) to verify the signature on the response metadata. The local server then checks the $Nonce_{LS}$ (returned by the content provider system) and compares it with the $Nonce_{LS}$ that it previously generated, to make sure they match. The local server, after validating the authenticity of the message (signature) and $Nonce_{LS}$, then updates the local server metadata (including its trusted time) using the metadata from the content provider system.

In step 224, the local server generates reply metadata that is signed with the private key associated with $Cert_{LS}$. The reply metadata includes local server trusted time as synchronized with the trusted time of the content provider system, and transmits this reply metadata to the content provider system. The content provider system receives the reply metadata and verifies its authenticity. 226 This verification includes a comparison of the trusted time of the local server with that of the content provider system in order to verify that the local server trusted time is sufficiently close to that of the content provider system. The verification further includes a check of the authenticity of the data through public key infrastructure (PKI) signature checking. If the reply metadata is not verified, then the content is refused. 228 Alternatively if the data is verified, the content provider system generates a license corresponding to the requested content and signs the license with the content provider system's private signing key. 230 The content provider system then transmits the content digital license to the local server thus permitting the local server to download the requested content from the content provider system. 232

Figure 3:
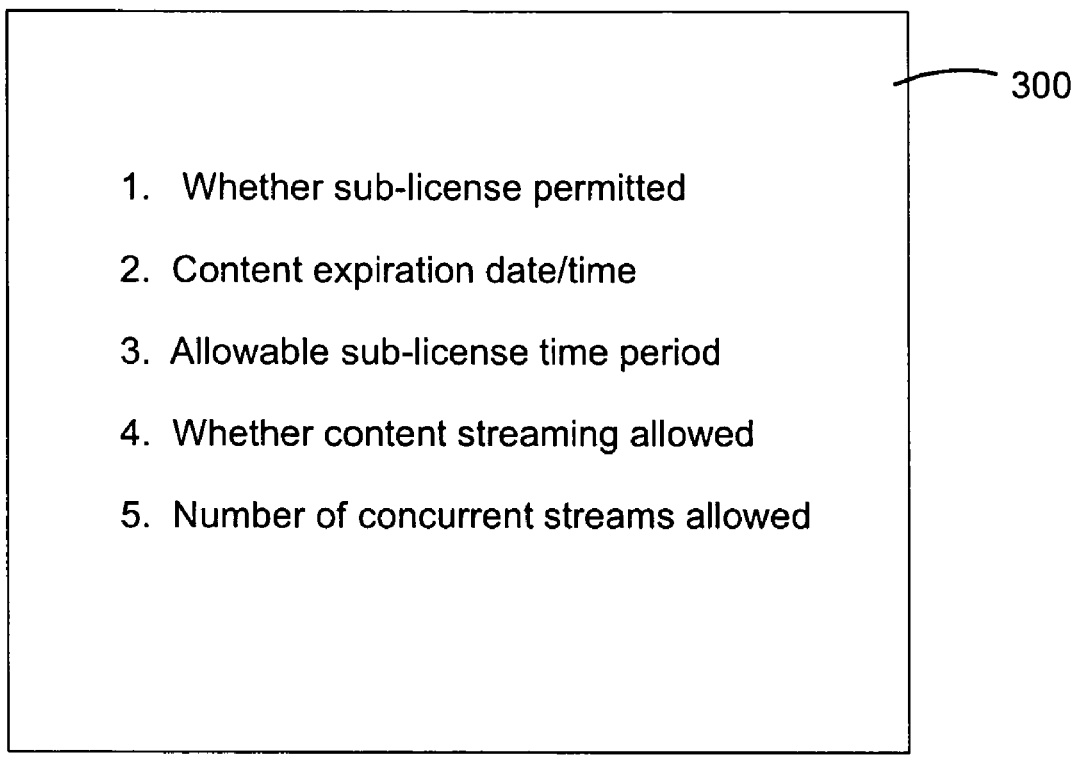
FIG. 3 is a simplified diagram depicting selected license content of a license received from a content provider system by a local server.

As shown in FIG. 3, the digital license 300 provided by the content provider system includes a bundle of original usage rights for the requested content. In some embodiments, these original usage rights include: (1) an authorization for the issuance of sublicenses by the local server to authorized clients; (2) the date and time when the content expires thus preventing any further use of the content; (3) the expiration time period, i.e. the time period during which any digital sublicenses may remain alive; (4) whether streaming of the content is allowed; and (5) a maximum permitted license count, i.e., the number of concurrent content streams of the requested item or items of content that is allowed.

Figure 4A:
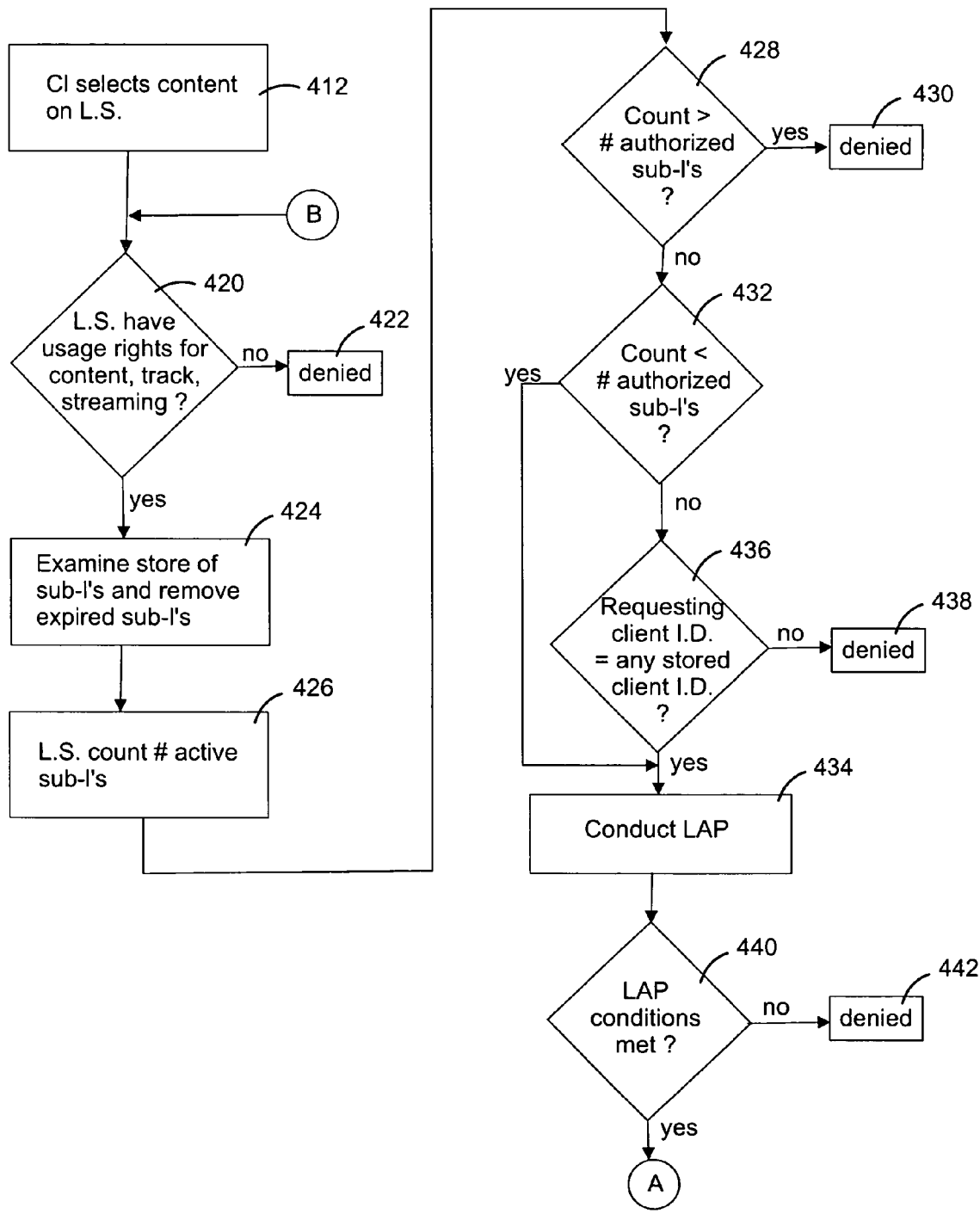
FIGS. 4a and 4b are simplified flow diagrams of a process by which a client device obtains a sublicense from a local server.
Figure 4B:
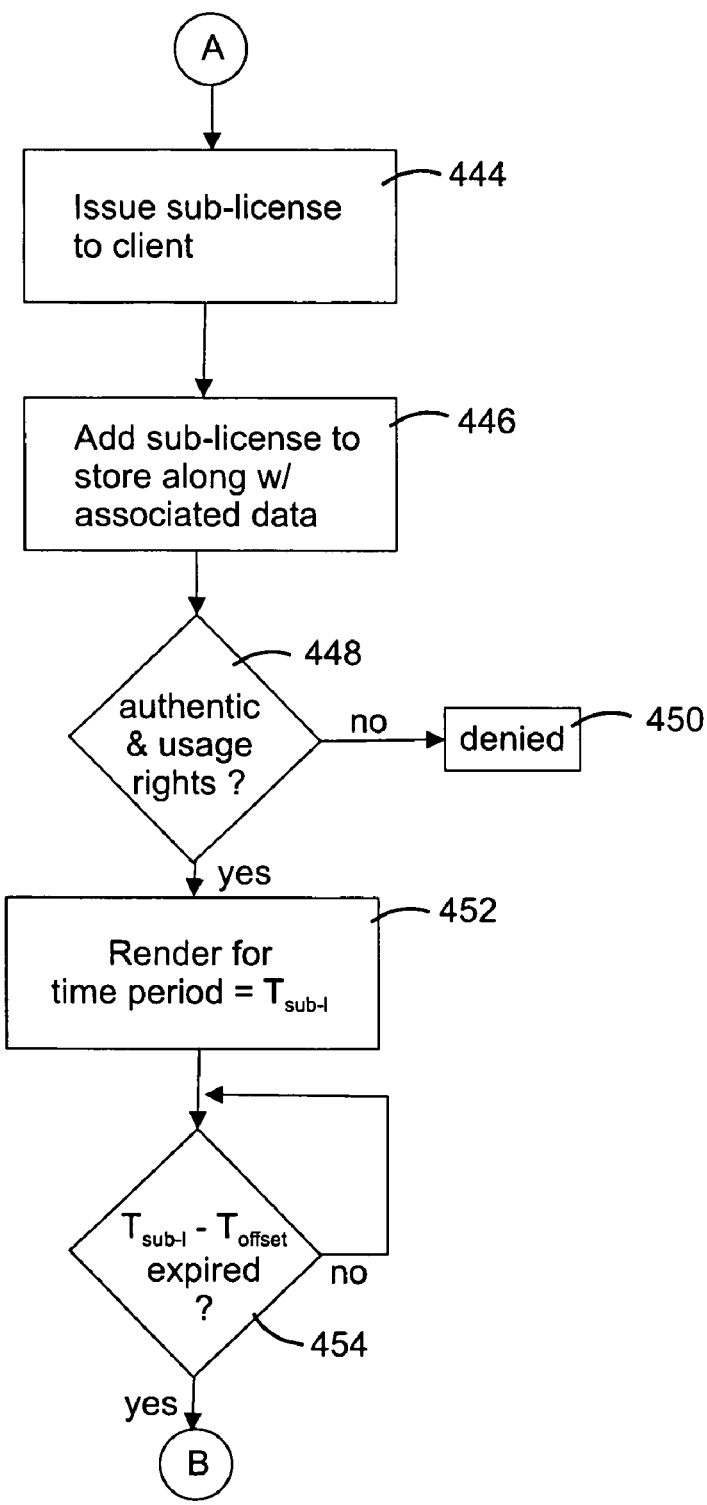

FIGS. 4a and 4b depict a simplified flow diagram of a process by which a client device obtains a sublicense from a local server device for enabling rendering of the content by the client device. In step 412 the client device reviews the available content located on the local server and makes a selection. This selection process can be done via a browser interface or other selection methods.

The local server compares its usage rights as obtained from the service provider with the requested content and determines whether the local server has the appropriate usage rights for the requested content track including authorization for streaming the data. 420 If the requested content is not consistent with the usage rights of the original digital license 300 then the request for the content is denied. 422 Alternatively, if the usage rights available to the local server are consistent with the requested content, then an active sublicense count calculation is made. First, the local server examines its secure store of sublicenses associated with the requested content and removes any expired sublicenses. 424

In step 426 the local server then counts the number of remaining, active sublicenses located in its secure store. A determination is made by the local server whether the count of active sublicenses exceeds the number of authorized sublicenses set forth in the original license. 428 If the count exceeds the number of authorized sublicenses, then the request for the new sublicense is denied. 430 (This also may indicate that the local server is already in violation of its original usage rights. However, this step is provided to prevent issuing even more sublicenses.)

Figure 5:
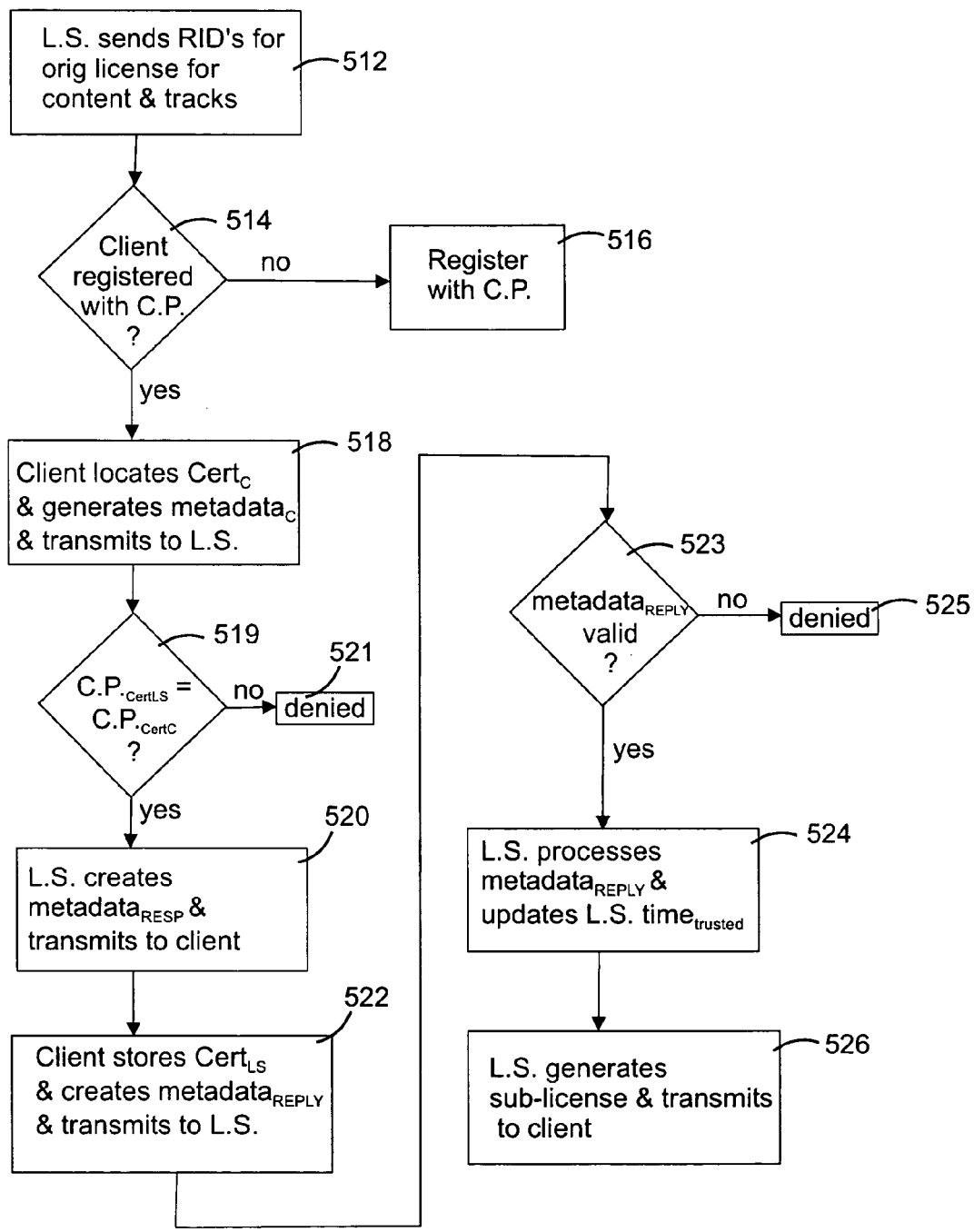
FIG. 5 is a simplified flow diagram of a license acquisition protocol between a client device and a local server.

Alternatively, if the count of active sublicenses does not exceed the number of authorized sublicenses, a determination is made whether the count is less than the number of authorized sublicenses. 432 If the count of active sublicenses is less than the number of authorized sublicenses, then it is known that the request for the new sublicense will not violate the original license 300 limitations and the system will enter into a license acquisition protocol (LAP) 434 which is explained in more detail in FIG. 5.

On the other hand, if it is determined that the count of the number of active sublicenses is not less than the authorized number, then it is known that the counts are equal. In other words, having determined in step 428 that the count of active sublicenses was not greater than the authorized number, and having determined in step 432 that the count of active sublicenses was not less than the authorized number, then the only remaining scenario would be that the count of active sublicenses is equal to the authorized number as set forth in the original license 300.

Therefore, in step 436 a determination is made whether the identification of the client device that is requesting the new sublicense is the same as the identification of any client device that has been issued any of the active, unexpired sublicenses. If the requesting client device is not the same, then it is known that the requested sublicense would result in a total number of active sublicenses in excess of the authorized amount. Thus a request for the additional sublicense would be denied. 438

On the other hand, if the identification of the requesting client device is the same as one of the client devices that are currently using an active sublicense, then it is known that the request for the new sublicense would not result in an excessive number of authorized sublicenses. The presumption would be that the existing, active sublicense that is associated with the same requesting client device is about to expire. Under this situation, therefore, control would proceed to step 434 where the license acquisition protocol occurs.

According to this counting process described in steps 424-438, it will be appreciated that the content provider system can limit the number of authorized, active sublicenses associated with one item of content, or the number of authorized, active sublicenses associated with all items of content stored on the local server that were provided by the content provider system.

In step 440 a determination is made whether the license acquisition protocol conditions are met. If they are not, then the request for the sublicense is denied. 442 Alternatively, if the protocol conditions are met, then the local server issues a sublicense to the client device. 444 In step 446 the local server adds the identity of this newly-issued sublicense to its secure store along with data associated with the sublicense. In the secure store, the newly-issued sublicense data is added to the data associated with other sublicenses that are associated with both (a) the requested content, and (b) the content provider. The associated data includes the identification of the requesting client device along with the start and end times of the newly issued sublicense.

In step 448 the client device receives the sublicense, verifies its authenticity, and confirms that the client device has usage rights that are consistent with the sublicense and the content. If the authenticity or usage rights are not confirmed, the client device will not render the content. 450 Alternatively, if the authenticity and usage rights are confirmed, then the client device renders the content for a time period equal to the authorized "life" ($T_{sub\_l}$) of the sublicense. 452

While the content is being rendered by the client device, a counter or clock runs in the background and a determination is made whether a certain time period has expired. 454 This time period is equal to the authorized "life" of the sublicense minus an offset value ($T_{offset}$). When this time period has expired, control returns to step 420 whereupon a new sublicense is requested by this same client device. Therefore the offset value of step 454 is a sufficient amount of time to permit the system to proceed through the various steps and protocol for the issuance of another sublicense prior to the expiration of the time period ($T_{sub\_l}$) or "life" of the previous sublicense. This provides rendering continuity so that the client device can continue to render the content in an uninterrupted fashion while receiving a renewal sublicense prior to the expiration of the previous sublicense.

FIG. 5 depicts a simplified flow diagram of the license acquisition protocol referenced in steps 434, 440, 442 and 444 of FIGS. 4a and 4b. In step 512, the local server transmits the rights identifiers (RID's) associated with the original license for the requested item of content and requested tracks. The client device receives this data and determines the identity of the content provider system that issued the original license and further determines whether the client device has been registered with the content provider system. 514 If the client device has not previously registered with the content provider system, then it proceeds with registration. 516 If the client device is registered, it locates a service-specific digital certificate ($Cert_{CL}$) that it had received from the content provider system at the time of client device registration, generates a set of metadata which includes data associated with the identity of the client device and a client device nonce ($Nonce_{CL}$), and transmits all of this data along with the $Cert_{CL}$ to the local server. 518

In step 519, the local server receives this data, locates a local server digital certificate ($Cert_{LS}$) that the local server previously had obtained from the content provider system and compares the identity of the content provider system that issued the $Cert_{LS}$ with the identity of the content provider system that issued the $Cert_{CL}$ to verify that they are the same. If they are not the same, then the request for the sublicense is denied. 521. Alternatively, if the identities of the content provider systems are the same, then the local server generates another local server nonce ($Nonce_{LS}$) and generates responsive metadata that includes data corresponding to the identity of the local server as well as the trusted time of the local server. The responsive metadata is signed with a private key associated with the $Cert_{LS}$ and this metadata and the $Cert_{LS}$ are transmitted to the client device. 520 While the illustrated embodiment involves a comparison of the identity of the content provider system that issued the $Cert_{LS}$ with the identity of the content provider system that issued the $Cert_{CL}$, alternative embodiments involve a check for and acceptance of an indirect trust path, ie., a check for a common certificate issuer in the certificate issuance chain who is located upward in the certificate hierarchy.

In step 522, the client device checks the $Nonce_{CL}$ in the response with the $Nonce_{CL}$ that it sent in the request. (If they are not the same, then the sublicense request is denied.) The client device stores the $Cert_{LS}$ and processes the response metadata by updating its local copy of the metadata. This metadata is used to create reply metadata which includes a synchronized value of the client trusted time (i.e., a value of the client device's trusted time that has been modified to correspond to the trusted time of the local server) as well as data corresponding to the identity of the client device. This reply metadata is signed using the private key associated with the $Cert_{CL}$ and transmitted to the local server.

The local server receives this reply metadata and determines whether it is valid. 523 If it is not, then the request for the sublicense is denied. 525 Alternatively, if the reply metadata is valid, then the local server processes the reply metadata by, among other things, checking the value of the client device's trusted time to ensure that it is close to the value of the local server's trusted time. In other words, the difference between the two trusted times is measured and compared against a maximum allowed trusted time difference. Additionally, the local server updates its value of the trusted time if the client device's value of trusted time is later. 524 (In alternative embodiments, however, the local server may not be considered to be a device that is likely to have the more accurate trusted time. In such a case, the local server would not update its trusted time at this point in the process.) The local server then generates and signs a digital sublicense (including a content decryption key) and transmits it to the client device. 526 Control then proceeds to step 446 of FIG. 4b as previously described.

Thus disclosed is a new and secure method and system by which a license holder acquires an original digital license to protected content provided by a content provider system, and then in turn delegates all or part of the grants in that original license to other qualified devices or clients. It is not required that the content be transformed in any manner as it is transferred to the client devices. The content remains in its original, protected form until it is received at the client device along with a digital sublicense that the client device receives from the original license holder whereupon the content is then rendered.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of distributing content wherein the content is comprised of a plurality of portions of the content, the method comprising:
   storing the content and a first digital license on a first device of a user, wherein the content and the first digital license are provided by a content provider system, said first digital license being adapted to govern the use of the content by the first device and having a first expiration time period, wherein being adapted to govern the use of the content includes permitting the first device to determine whether the first device may provide a decryption key for use by a secondary device;
   storing a first digital certificate on the first device, said first digital certificate originating from the content provider system and including a first set of data corresponding to the identity of the content provider system;
   storing a second digital certificate on the secondary device, said second digital certificate originating from the content provider system and including a second set of data corresponding to the identity of the content provider system;
   transmitting a first digital request and the second digital certificate from the secondary device to the first device, said first digital request corresponding to a first request for use of the content;
   comparing the first set of data with the second set of data;
   transmitting a second digital license from the first device to the secondary device after receipt by the first device of the first digital request and if the first and second sets of data correspond to the same content provider system, said second digital license governing the use of the content by the secondary device and having a second expiration time period that is less than the first expiration time period;
   providing a first portion of the plurality of portions of the content from the first device to the secondary device, said first portion of the content being encrypted;
   decrypting the first portion of the content at the secondary device using the decryption key during at least a portion of the second expiration time period,
   transmitting a second digital request from the secondary device to the first device, said second digital request corresponding to a second request for use of the content, wherein the transmitting of the second digital request occurs after the step of transmitting the second digital license;
   transmitting a third digital license from the first device to the secondary device after receipt by the first device of the second digital request, said third digital license being adapted to govern the use of the content by the secondary device and having a third expiration time period that is less than the first expiration time period;
   providing a second portion of the plurality of portions of the content from the first device to the secondary device, said second portion of the content being encrypted; and
   decrypting the second portion of the content at the secondary device during at least a portion of the third expiration time period,
   wherein the first device and the secondary device are located on a premises and wherein the content provider system is located other than on the premises.

2. The method of claim 1 wherein the second and third expiration time periods are each less than 60 minutes.

3. The method of claim 1 wherein the premises is one of a residence and a dormitory.

4. The method of claim 1 wherein the premises is one of a resort, a motel, and a hotel.

5. The method of claim 1 wherein the premises is one of a ship and an aircraft.

6. The method of claim 1 further comprising the step of receiving the content and the first digital license from the content provider system via the Internet.

7. The method of claim 1 wherein the secondary device and the first device are adapted for digital communication via a local area network.

8. The method of claim 1 wherein the content is comprised of one of audio data, video data and image data.

9. The method of claim 1 wherein the secondary device is one of an audio device and a video device, and wherein the secondary device is adapted to render the content.

10. The method of claim 1 wherein the secondary device is a set-top box coupled to a television.

11. The method of claim 1 wherein the secondary device is one of a desk top, general purpose computer and a portable, general purpose computer.

12. The method of claim I further comprising:
   transmitting a plurality of additional digital requests from a plurality of additional secondary devices to the first device, each of said plurality of additional digital requests corresponding to an additional request for use of the content;
   transmitting a plurality of additional digital licenses from the first device to the plurality of additional secondary devices after receipt by the first device of the plurality of additional digital requests, the plurality of additional digital licenses governing the use of the content by the plurality of additional secondary devices and having a plurality of additional expiration time periods each of which is less than the first expiration time period;
   providing a plurality of additional portions of the content from the first device to the plurality of additional secondary devices, the plurality of additional portions of the content being encrypted;

decrypting the plurality of additional portions of the content wherein each one of the plurality of additional secondary devices decrypts one of the plurality of additional portions of the content during one of the plurality of additional expiration time periods; and simultaneously rendering the plurality of additional portions of the content.

13. The method of claim 12, wherein the first digital license includes a maximum permitted license count, the method further comprising:

calculating an active license count at the first device, said active license count corresponding to a first sum of the second digital license and the plurality of additional digital licenses that have been transmitted from the first device reduced by a second sum of the second digital license and the plurality of additional digital licenses that correspond to expiration time periods that have expired;

transmitting a supplemental digital request from a supplemental secondary device to the first device, said supplemental digital request corresponding to a supplemental request for use of the content; and transmitting a supplemental digital license from the first device to the supplemental secondary device if the active license count does not exceed the maximum permitted license count, said supplemental digital license governing the use of the content by the supplemental secondary device and having a supplemental expiration time period less than the first expiration time period.

14. A method of distributing a plurality of items of content provided by a content provider system, the method comprising:

storing the plurality of items of content and a first digital license on a first device, said first digital license being adapted to govern the use of the plurality of items of content by the first device, said first digital license having a first expiration time period and having a maximum permitted license count;

transmitting a plurality of secondary digital licenses from the first device to a plurality of secondary devices, said plurality of secondary digital licenses governing the use of the plurality of items of content by the plurality of secondary devices and having a plurality of second expiration time periods, each of which is less than the first expiration time period;

calculating an active license count at the first device, said active license count corresponding to a first sum of the number of the plurality of secondary digital licenses that have been transmitted from the first device reduced by a second sum of the number of the plurality of secondary digital licenses having second expiration time periods that have expired;

transmitting a digital request from another secondary device to the first device, said digital request corresponding to a request for use of one of the plurality of items of content;

transmitting another secondary digital license from the first device to the other secondary device if the active license count does not exceed the maximum permitted license count, said other secondary digital license governing the use of the one of the plurality of items of content by the other secondary device and having another expiration time period that is less than the first expiration time period.

15. The method of claim 14 wherein the first device and the plurality of secondary devices are located on a premises and wherein the content provider system is located other than on the premises.

16. A system for distributing content originating from a content provider system, wherein the content is comprised of a plurality of portions of the content, the system comprising:

a first device of a user, wherein the first device has a first device processing unit capable of executing first device software routines;

first device programming logic executed by the first device processing unit, a secondary device having a secondary device processing unit capable of executing secondary device software routines, said secondary device being adapted for communication with the first device; and secondary device programming logic executed by the secondary device processing unit, wherein the first device and the secondary device are located on a premises and wherein the content provider system is located other than on the premises, wherein the first device programming logic comprises:

means for storing the content and a first digital license on the first device, wherein the content and the first digital license are provided by the content provider system, said first digital license being adapted to govern the use of the content by the first device and having a first expiration time period, wherein being adapted to govern the use of the content includes permitting the first device to determine whether the first device may provide a decryption key for use by the secondary device; and means for storing a first digital certificate on the first device, said first digital certificate originating from the content provider system and including a first set of data corresponding to the identity of the content provider system;

wherein the secondary device programming logic comprises:

means for storing a second digital certificate on the secondary device, said second digital certificate originating from the content provider system and including a second set of data corresponding to the identity of the content provider system; and means for transmitting a first digital request and the second digital certificate from the secondary device to the first device, said first digital request corresponding to a first request for use of the content;

wherein the first device programming logic further comprises:

means for comparing the first set of data with the second set of data;

means for transmitting a second digital license from the first device to the secondary device after receipt by the first device of the first digital request and if the first and second sets of data correspond to the same content provider system, said second digital license governing the use of the content by the secondary device and having a second expiration time period that is less than the first expiration time period; and means for providing a first portion of the plurality of portions of the content from the first device to the secondary device, said first portion of the content being encrypted;

wherein the secondary device programming logic further comprises:

means for decrypting the first portion of the content at the secondary device using the decryption key during at least a portion of the second expiration time period; and means for transmitting a second digital request from the secondary device to the first device, said second digital request corresponding to a second request for use of the content, wherein the transmitting of the second digital request occurs after the transmitting of the second digital license;

wherein the first device programming logic further comprises:

means for transmitting a third digital license from the first device to the secondary device after receipt by the first device of the second digital request, said third digital license being adapted to govern the use of the content by the secondary device and having a third expiration time period that is less than the first expiration time period; and means for providing a second portion of the plurality of portions of the content from the first device to the secondary device, said second portion of the content being encrypted; and wherein the secondary device programming logic further comprises:

means for decrypting the second portion of the content at the secondary device during at least a portion of the third expiration time period.

17. The system of claim 16 wherein the second and third expiration time periods are each less than 60 minutes.

* * * * *

UNITED STATES PATENT AND TRADEMARK OFFICE
CERTIFICATE OF CORRECTION

| | |
|---|---|
| PATENT NO. | : 7,801,819 B2 |
| APPLICATION NO. | : 10/957109 |
| DATED | : September 21, 2010 |
| INVENTOR(S) | : Swenson et al. |

Page 1 of 1

It is certified that error appears in the above-identified patent and that said Letters Patent is hereby corrected as shown below:

Claim 12, column 14, line 50, delete "claim I" and insert --claim 1--.

Signed and Sealed this

Fourteenth Day of December, 2010

David J. Kappos
*Director of the United States Patent and Trademark Office*